United States Patent [19]
Beith

[11] 3,726,566
[45] Apr. 10, 1973

[54] WHEEL STRUCTURE
[75] Inventor: Richard D. Beith, Alamo, Calif.
[73] Assignee: E. T. Industries, Inc.
[22] Filed: Jan. 2, 1970
[21] Appl. No.: 166

[52] U.S. Cl. ..............................301/37 R, 301/63 R
[51] Int. Cl. .............................B60b 3/00, B60b 7/00
[58] Field of Search.................301/37 R, 37 S, 37 T, 301/63 R, 63 DD

[56] References Cited
UNITED STATES PATENTS

| | | | |
|---|---|---|---|
| 2,057,565 | 10/1936 | Eksergian | 301/63 X |
| 2,652,286 | 9/1953 | Lyon | 301/37 S |
| 3,346,301 | 10/1967 | Hurst | 301/37 RT |
| 3,517,968 | 6/1970 | Tully | 301/37 RT |
| 2,115,183 | 4/1938 | Sinclair | 301/64 SD |
| 3,669,501 | 6/1972 | Derleth | 301/37 P |

FOREIGN PATENTS OR APPLICATIONS

| | | | |
|---|---|---|---|
| 298,402 | 10/1928 | Great Britain | 301/37 S |
| 1,082,035 | 9/1967 | Great Britain | 301/37 S |
| 507,801 | 6/1939 | Great Britain | 301/63 R |

*Primary Examiner*—Richard J. Johnson
*Attorney*—Ralph L. Mossino

[57] ABSTRACT

A wheel cover mounted to cover the front surface of a wheel has a concavely contoured front surface. The cover is provided with a central hub opening and circularly spaced lug bolt apertures. Lips are provided about the outer periphery, central hub opening and lug apertures of the wheel cover to grip respectively about the periphery of the tire mounting rim, edge of the hub opening and edges of the lug apertures of the wheel. Adhesive is sandwiched between the wheel and wheel cover which, together with the gripping lips of the wheel cover, permanently and rigidly fix the wheel cover to the wheel making a unitary wheel structure.

4 Claims, 6 Drawing Figures

PATENTED APR 10 1973 3,726,566
SHEET 1 OF 2
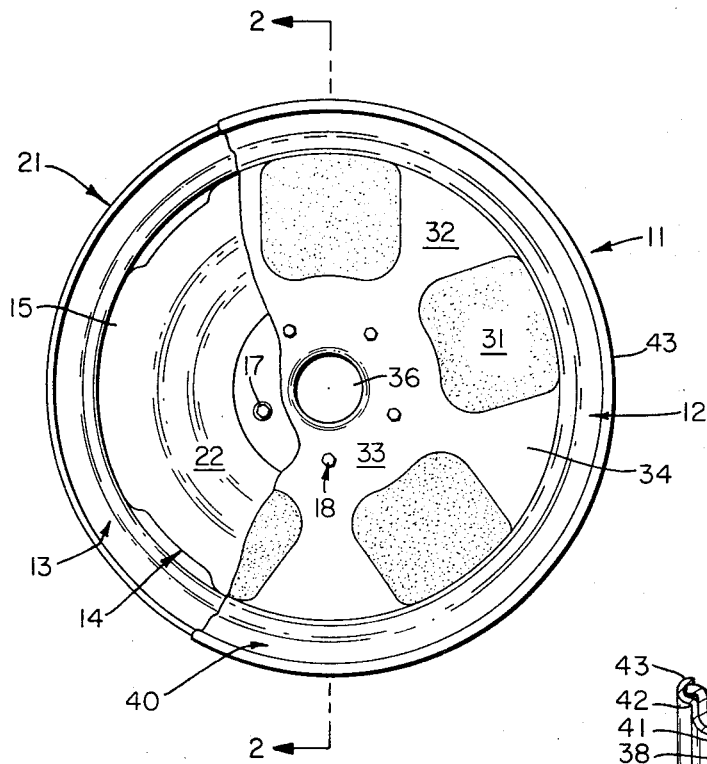
FIG_1
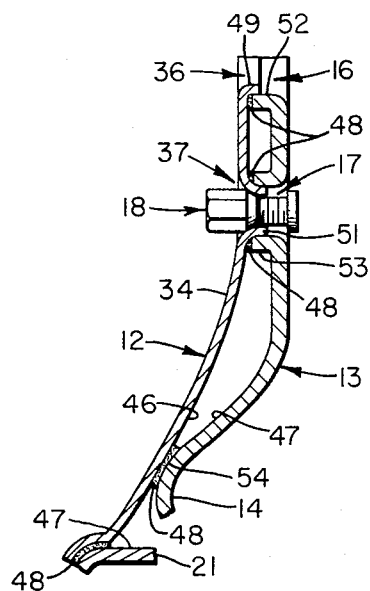
FIG_3
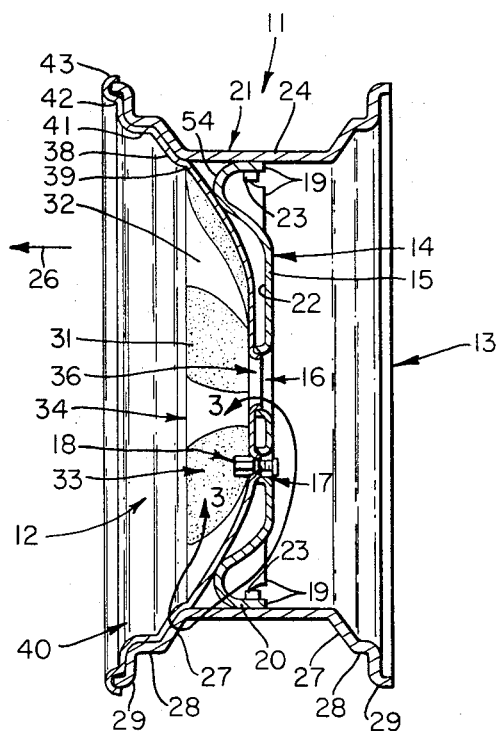
FIG_2
INVENTOR.
RICHARD D. BEITH
BY Ralph L. Mossino
AGENT 3,726,566

INVENTOR.
RICHARD D. BEITH

BY Ralph L. Mossins

AGENT

WHEEL STRUCTURE

FIELD OF INVENTION

The present invention relates generally to wheel structures and, more particularly, to a decorative wheel structure cover.

BACKGROUND OF INVENTION

Customizing vehicles has become a popular and common practice. Of the many decorative items used to customize vehicles, decorative wheels are one of the items most commonly used. The style leader in decorative vehicle wheels is considered to be the wheels commonly referred to as "mags." Most mag wheels are constructed by a a sand or die cast process. Such wheels are considerably more expensive than the steel center wheels commonly provided by the manufacturers of vehicles. Because the sand or die cast decorative wheels are expensive, decorative wheel covers often are employed in an attempt to create an authentically appearing imitation of the decorative mag wheels.

Vehicle customizing enthusiasts generally demand the items used to customize their vehicles be authentic or indistinguishable from authentic items. However, currently available wheel covers used to imitate decorative mag wheels do not create authentically appearing mag wheels and, at a glance, can easily be distinguished from authentic mag wheels by informed enthusiasts. One of the characteristics common to most of these currently available imitation mag wheel covers readily distinguishing them from authentic mag wheels is the curvature of the front surface plane of wheel covers. The front surface of such wheel covers curve convexly away from the tire mounting rim to which they are mounted and cover the vehicle hubs which extend through the centers of the wheels. An authentic mag wheel has a front surface plane that extends inward towards or is generally concave towards the hub opening of the wheel. Thus, whereas the authentic mag wheel has a design that creates a decorative effect of the center of the wheel being recessed, the aforedescribed imitation mag wheel covers create an effect of the center of the wheel protruding out from the wheel.

Another characteristic common to many of the currently available imitation mag wheel covers readily distinguishing them from authentic mag wheels is the positioning of the wheel covers relative to the wheel. Most imitation mag wheel covers are spaced from the covered wheel over a large area of the confronting surfaces. This creates a tin-like sound when the wheel covers are struck. While some wheel covers are fashioned to have configurations which may closely follow or even lie along a portion of the confronting surface of the covered wheel, they are not rigidly fixed relative to the confronting surface. Hence, they also emit a tin-like sound when struck. On the other hand, an authentic mag wheel emits a muffled sound when struck.

In addition to the decorative characteristic, authentic mag wheels have safety and ease of mounting features not found in wheel structures having imitation mag wheel covers. To remove a wheel from a vehicle hub which has an imitation mag wheel cover generally requires the removal of the wheel cover in order to gain access to the lug bolts. For reasons of safety, wheel covers are so securely mounted to the covered wheel that they often are difficult to remove. However, since authentic mag wheels are secured to the vehicle hubs by exposed lug bolts, they are considerably easier to remove from the vehicle hubs.

While wheel covers are securely mounted to the covered wheel, repeated blows thereon and road vibrations often caused the wheel covers to become loose. It is common for a vehicle to throw a loose wheel cover while underway. In many instances, the thrown wheel cover cause accidents, for example, between other vehicles trying to avoid the thrown wheel cover or by striking persons or property along the roadway. Since authentic mag wheels do not carry wheel covers, they are not a source of such road hazards and, therefore, are considerably safer.

Therefore, considerable advantage is to be gained by providing a wheel structure which facilitates the construction of inexpensive imitation mag wheels which, to an informed observer, appear as authentic and are indistinguishable from decorative mag wheels. Additional advantages will be realized from a wheel structure including a wheel cover and wheel assembly which is not susceptible to coming apart as a result of being repeatedly subjected to blows or road vibrations.

SUMMARY OF INVENTION

Accordingly, it is an object of the present invention to fix a wheel cover permanently and rigidly to a wheel to form a unitary wheel structure.

More particularly, it is an object of the present invention to provide a wheel structure which may be quickly and easily secured to and removed from a vehicle hub while not constituting a source of road hazards during the operation of the vehicle.

Another object of the present invention is to provide an inexpensive decorative wheel structure.

It is still another object of the present invention to provide a decorative wheel structure that facilitates the manufacture of authentically appearing imitation decorative wheels.

Still another object of the present invention is to provide an inexpensive imitation mag wheel which, to an informed observer, appear as authentic and are indistinguishable from decorative mag wheels.

Yet another object of the present invention is to provide an inexpensive imitation mag wheel structure which to an informed observer, appears and, when struck, sounds like an authentic decorative mag wheel.

To achieve the foregoing objects, the wheel structure of the present invention includes a wheel, such as those commonly supplied by the manufacturers of vehicles, and a wheel cover having a concavely contoured outboard surface which faces away from the vehicle body when the wheel structure is mounted to the vehicle body. The concavely contoured wheel cover contacts a substantial area of the confronting surface of the wheel. A lip is provided about at least the outer periphery of the wheel cover which grips the edge of the tire mounting rim of the wheel. The wheel cover is provided with a central hub opening to allow the passage of the vehicle hub extending through hub opening of the wheel. Lug apertures are also provided about the wheel cover and are located therein to be registered with the lug apertures of the wheel.

To permanently fix the wheel cover rigidly to the wheel and, thereby, form a unitary wheel structure, the contacting confronting surfaces of the wheel cover and wheel are bound together. Binding the wheel cover to the wheel prevents the wheel cover from being thrown from the wheel while the vehicle carried by the wheel structure is under operation. Furthermore, binding the wheel cover to the wheel over a substantial area of the confronting surfaces also serves to eliminate the characteristic tin-like sound produced when currently available wheel-wheel cover structures are struck.

Together, the concave contour of the wheel cover, lip about the periphery of the wheel cover and binding of the cover and wheel enable the construction of an authentically appearing and sounding imitation mag wheel structure. Since the wheel covers can be manufactured by an inexpensive stamping or molding process and readily available and inexpensive standard steel centered type wheels can be used to construct the wheel structure of the present invention, the advantages of an authentic and inexpensive imitation mag wheel can be made available which is acceptable to vehicle customizing enthusiasts.

BRIEF DESCRIPTION OF DRAWINGS

The foregoing and other objects and features of the wheel structure of the present invention will become apparent from the following description and claims considered together with the accompanying drawings of which:

FIG. 1 is a front elevation view of one embodiment of the wheel structure of the present invention.

FIG. 2 is a cross sectional view of the wheel structure taken along lines 2—2 of FIG. 1.

FIG. 3 is an enlarged fragmentary sectional view of the portion of the wheel structure delineated by lines 3—3 of FIG. 2.

DESCRIPTION OF PREFERRED EMBODIMENT

Figure 4:
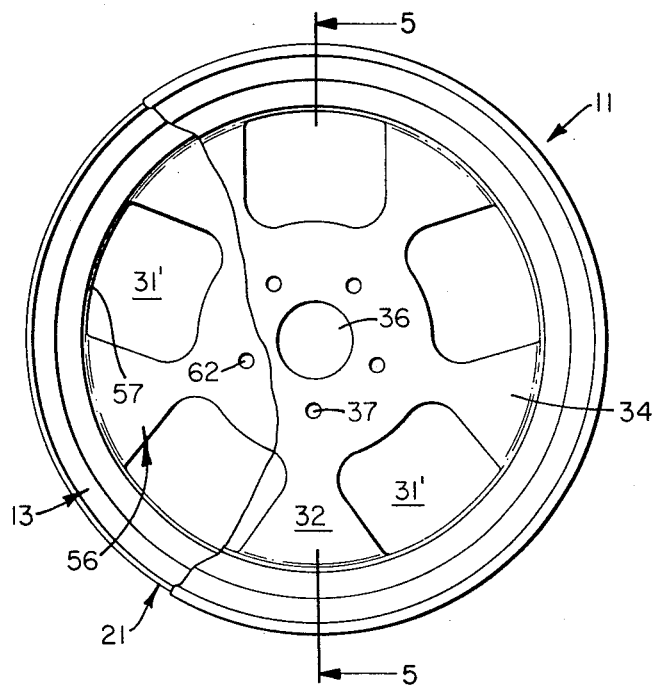
FIG. 4 is a front elevation view of another embodiment of the wheel structure of the present invention.

Referring to the figures, two embodiments of the wheel structure 11 of the present invention are illustrated. Each is seen to include a wheel cover 12 mounted to a wheel 13 or 13' with the embodiment illustrated by FIGS. 1–3 having a wheel 13 constructed like the wheels commonly provided by manufactures of vehicles. The embodiment of the wheel structure 11 illustrated by FIGS. 4–6 has a specially constructed inexpensive wheel 13' which together with the wheel cover 12 create a particularly authentic appearing imitation mag wheel structure.

Considering the embodiment of the wheel structure 11 illustrated by FIGS. 1–3, the wheel 13, such as those provided by manufactures of vehicles, has a generally radially extending disc wheel center or, as commonly referred to in the art, spider 14 including a central annular flange 15 having a hub opening 16 to receive a hub of a vehicle axial (not shown) therethrough. A plurality of lug bolt apertures 17 are circularly spaced about the flange 15 to receive lug bolt and nut means 18 therethrough by which the wheel structure 11 is mounted to a vehicle in the usual manner. The wheel center 14 also has four flange members 19 or felly axially extending from its periphery 20 at regular circumferentially spaced locations. The flange members 19 serve to join the wheel center 14 to a tire mounting rim 21 including axially displaced multi-flanged portions.

To create the deep recessed design effect characteristic of an authentic mag wheel structure, the wheel center 14 is joined to the tire mounting rim 21 with its outboard surface 22 facing in the direction relative to rim 21 which is the reverse of that of a normally constructed wheel provided by the manufacturers of vehicles. The flange members 19 are secured as by rivets 23 to an axially extending base flange 24 of the tire mounting rim 21 with the outboard surface 22 of the wheel center 14 facing, as represented by arrow 26, toward the conventionally inboard side of the tire mounting rim 21. As illustrated in FIG. 2, the axial expanse of the intermediate flange 28 of the normally inboard multi-flanged portion of the tire mounting rim 21 facing in the same direction as the outboard surface 22 of the wheel center 14 is greater than that of the other intermediate flange. Consequently, when the wheel center 14 and tire mounting rim 21 of commonly provided wheel 13 are joined together in this fashion, the outboard surface 22 of the wheel center 14 is axially displaced from the terminal flange 29 a greater distance than when they are joined together in the normal manner. This creates the deep recess effect.

The tire mounting rim 21 includes side flanges 27 which extend generally radially outward from each end of the base flange 24. Each of the side flanges 27 form into generally axially extending intermediate flanges 28. Radially and axially outward curving terminal flanges 29 extend from the intermediate flanges 28 to complete the tire mounting rim 21.

Figure 5:
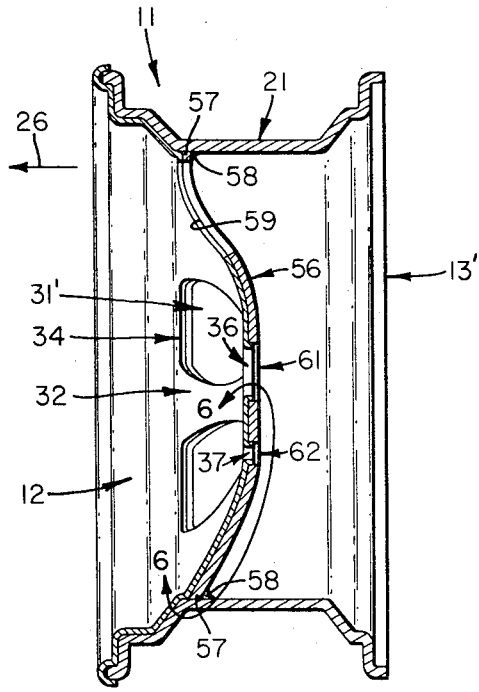
FIG. 5 is a cross sectional view of the wheel structure taken along lines 5—5 of FIG. 4.
Figure 6:
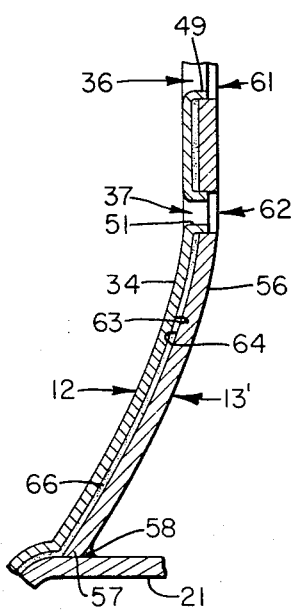
FIG. 6 is an enlarged fragmentary sectional view of the portion of the wheel structure delineated by lines 6—6 of FIG. 5.

The wheel cover 12 embodiment illustrated in the FIGS. 1–3 is of a design to imitate a mag wheel configuration commonly referred to as a "slotted" wheel. In the illustrated embodiment, the slotted wheel configuration imitation is created by contrasting dark and light surface areas 31 and 32. The slotted wheel configuration imitation also can be created by cutting out the dark surface areas, for example, as shown in the embodiment illustrated by FIGS. 4–6 by Reference No. 31', while leaving the light surface areas 32. The characteristically dark space behind the slots 31' of the wheel structure 11 embodiment illustrated by FIGS. 4–6 provides the contrasting dark surface areas. If a wheel 13 of the type forming the wheel structure 11 embodiment of FIGS. 1–3 is used with cut out or slotted wheel cover 12, the characteristically dark surface of the wheel center 14 behind the wheel cover 12 would provide the contrasting dark surface areas 31.

The wheel cover 12 may be constructed of steel, aluminum, plastic or any suitable material which is sufficiently strong to withstand the harsh usage which wheel covers encounter and whose surface may be decorated. A wheel cover 12 of steel would be constructed of, for example, twenty gauge steel. The light surface areas 32 would be provided by polishing or chrome plating the areas 32. The areas 31 would be painted black to form the dark surface areas.

A steel wheel cover 12 may be formed, for example, by a conventional stamping process so that its outboard surface 33 has a concavely contoured shape. More specifically, the wheel cover 12 has a radially and axially outward or concavely curving disc center 34 which defines a central hub opening 36 registered with the hub opening 16 of the disc wheel center 14. The disc center 34 also has a plurality of circularly spaced lug apertures 37 (See FIG. 3) registered with the lug bolt apertures 17 of the disc wheel center 14.

The wheel cover 12 also includes a multiple flanged portion 40 which extends from the periphery 39 of its disc center 34. The multiple flanged portion 40 has a side flange 38 which extends generally radially and axially outward from the periphery 39 of the disc center 34. An axially extending intermediate flange 41 extends from the side flange 38 to form into a radially and axially outward curving terminal flange 42. The multiple flanged portion 40 is terminated at its terminal flange 42 with a lip 43 circumferentially extending about the entire periphery of the wheel cover 12.

To create the desired authentically appearing and sounding imitation mag wheel effect, the wheel cover 12 is shaped to have its multiple flanged portion 40 nest with the multi-flanged portions of the tire mounting rim 21. The concavely curved disc center 34 of the wheel cover 12 extends inward from the base flange 24 of the tire mounting rim 21 to contact the surface 22 of the wheel center 14. While not contacting the entire area of the surface 22 of the wheel center 14, the confronting surface 46 (See FIG. 3) of the wheel cover 12 contacts a substantial area of the confronting surface 47 defined by the wheel center 14 and tire mounting rim 21 of the wheel 13.

Referring to the enlarged fragmentary sectional view of the wheel structure 11 illustrated in FIG. 3, to bind the wheel cover 12 permanently and rigidly to the wheel 13, adhesive 48 is sandwiched between the contacting confronting surfaces 46 and 47 of the wheel cover 12 and wheel 13. Adhesives most suitable for binding the wheel cover to the wheel 13 are structural adhesives such as Scotchweld provided by Minnesota Mining and Manufacturing Company, contact cements, and automotive weather-stripping cements. These adhesives are selected because of their resistance to deterioration during use and when exposed to the elements. Means other than adhesives may be used to bind the wheel cover 12 to the wheel 13. The most suitable of the alternative binding means is welding.

FIG. 3 shows the adhesive 48 placed between the multi-flanged tire mounting rim 21 and multiple flanged portion 40 as well as the wheel center 14 and disc center 34 of the wheel 13 and wheel cover 12 respectively. However, if multi-flanged tire mounting rim 21 and multiple flanged portion 40 nest tightly together, an authentically appearing and sounding wheel structure 11 can be obtained without placing adhesive 48 therebetween. The adhesive 48 between the contacting confronting surfaces 46 and 47 of the wheel center 14 and disc center 34 will permanently fix the wheel cover 12 to the wheel 13 whereby the wheel cover 12 will still be prevented from being thrown from the wheel 13.

As described hereinbefore, the multiple flanged portion 40 of the wheel cover 12 terminates at the lip 43. This lip 43 is formed to grip the edge of the terminal flange 29 of the multi-flanged tire mounting rim 21 and, thereby, aid in fixing the wheel cover 12 to the wheel 13. Additional lips 49 and 51 may be provided about the peripheries of the central hub opening 36 and each of the lug apertures 37, respectively, of the wheel cover 12. Since the hub opening 16 and lug bolt apertures 17 of many standard steel centered wheels fit snuggly around the vehicle hubs and lug bolts, the opening 16 and apertures 17 may have to be over-sized when the additional lips 49 and 51 are provided. When provided, these additional lips 49 and 51 grip respectively the edges of the hub aperture 16 and each lug bolt aperture 17 of the wheel 13 and, thereby, further aid in fixing the wheel cover 12 to the wheel 13.

As illustrated in FIG. 3, the hub opening 16 and lug bolt apertures 16 of the wheel 13 have surrounding ridges 52 and 53 respectively. These ridges require that the disc center 34 of the wheel cover 12 be spaced away from the wheel center 14 of the wheel 13 over a significant area of its confronting surface 46. However, adhesive 48 placed between the peaks of the ridges 52 and 53 and the wheel cover 12, and between the annular raised surface portion 54 and the wheel cover 12 secures the central portion of the wheel cover 12 relative to the central portion of the wheel 13. If the ridges 52 and 53 are not present, the gradient of the concave curvature of the disc center 34 of the wheel cover 12 would be slightly changed so that confronting surfaces 46 and 47 contacted at the central portions of the wheel cover 12 and wheel 13.

An even more authentically appearing and sounding imitation mag wheel structure 11 can be realized by constructing the wheel structure 11 in accordance with the embodiment illustrated by FIGS. 4–6. Like the embodiment illustrated by FIGS. 1–3, the wheel structure 11 embodiment of FIGS. 4–6 has a wheel 13' covered by a wheel cover 12. However, the wheel 13' has a regular concavely contoured wheel center 56. The concave contour of the wheel center 56 is made relative to that of the disc center 34 of the wheel cover 12 so that, when the wheel cover 12 and wheel 13' are assembled to form the wheel structure 11, the wheel center 56 nests with the disc center 34. The wheel 13' is formed by joining the wheel center 56 at its periphery 57 to the standard tire mounting rim 21 by a weld 58. The wheel center 56 and tire mounting rim 21 are joined with the outboard surface 59 of the wheel center 56 facing relative to the rim 21 in a direction as represented by arrow 26 which is normally the the inboard side of the rim. That is, relative to the rim 21, the outboard surface 59 faces in a direction which is the reverse of that normally faced by the outboard surface of a wheel center when joined to a tire mounting rim to form a standard wheel structure, such as, provided by vehicle manufacturers. A hub opening 61 and lug bolt apertures 62 are provided in the wheel 13' to be registered with the central hub opening 36 and lug apertures 37 respectively of the covering wheel cover 12 to allow mounting of the wheel structure 11 to a vehicle.

Referring to FIG. 6, the entire confronting surfaces 63 and 64 of the wheel cover 12 and wheel 13' are in contact. Adhesive 66 is placed between the contacting confronting surfaces 63 and 64 to permanently fix the wheel cover 12 to the wheel 13'. Since the entire area of the confronting surfaces 63 and 64 can be bound together, an imitation mag wheel structure constructed in accordance with the embodiment of FIGS. 4-6 can be made to appear and sound most authentic. As in the embodiment of FIGS. 1-3, the wheel cover 12 can be provided with lips 49 and 51 to grip the peripheries of the hub opening 61 and each lug bolt aperture 62 of the wheel 13' to aid in fixing the wheel cover 12 to the wheel 13'. A wheel structure 11 constructed in accordance with the foregoing description allows for the manufacture of an inexpensive authentically appearing and sounding mag type wheel. Furthermore, because the wheel cover 12 of such a wheel structure 11 is permanently and rigidly fixed to the wheel 13, such wheel structures 11 are far safer than the common wheel-demountable wheel cover assemblies. Furthermore, by providing hub and lug apertures 36 and 37 in the wheel cover 12 to allow the vehicle hub and lug bolts to pass therethrough, the wheel structure 11 of the present invention is easier to secure to and remove from vehicles. It should be appreciated that, if it is desired to cover the vehicle hub extending through the wheel structure 11, a hub cover commonly used with mag wheels may be employed. Such hub covers are permanently fastened to the mag wheel at locations within the circle defined by the circularly arranged lug bolt apertures.

What is claimed is:

1. A wheel structure comprising a wheel having a tire mounting rim secured to a wheel center, said wheel having an outboard surface and an inboard surface, said wheel center defining a hub opening for receiving a hub of a vehicle axle and a plurality of lug bolt apertures about the hub opening for receiving lug bolt and nut means to secure the wheel structure to the vehicle; a wheel cover mounted to said wheel in covering relation to the wheel's outboard surface, said wheel cover having a circumferential portion extending from a disc shaped central portion, said circumferential portion in covering relation with the tire mounting rim, said disc shaped central portion having a concavely contoured surface extending from the circumferential portion, said disc shaped central portion defining a plurality of apertures about a centrally located aperture which respectively are registered with the lug bolt apertures and hub opening of the wheel center; lip members about the edges of the apertures of the wheel cover extending within and gripping the edges of the hub opening and lug bolt apertures of the wheel; a lip portion circumferentially disposed about the periphery of the circumferential portion of the wheel cover extending over and gripping the periphery of the tire mounting rim; and means binding the wheel cover permanently to the wheel to form an integral wheel structure.

2. The wheel structure according to claim 1 wherein the circumferential portion of the wheel cover is nested in contacting relation with the tire mounting rim of the wheel, the surface of the concavely contoured disc shaped central portion of the wheel cover facing the wheel center contacts a substantial area of the confronting surface of the wheel center, and the binding means is adhesive sandwiched between the wheel cover and wheel to permanently bind them together at locations of their contacting confronting surfaces.

3. A wheel structure including an automotive wheel having a multi-flanged tire mounting rim and a generally disc shaped wheel center, said tire mounting rim having two multi-flanged portions respectively extending from opposite ends of an axially extending base flange, each of said multi-flanged portions including flange segments extending radially and axially of the wheel with the axial expanse of one of the multi-flanged portions greater than that of the other, said generally disc shaped wheel center having outboard and inboard surfaces and an annular portion axially extending in the direction faced by said outboard surface, the portion of the wheel center surrounded by said annular portion defining a hub opening and a plurality of lug bolt apertures about said hub opening, the combination therewith comprising: means joining the wheel center to the tire mounting rim at the base flange proximate the multi-flanged portion of lesser axial expanse with the outboard surface of said wheel center facing in the direction of the multi-flanged portion of greater axial expanse; a wheel cover mounted in covering relation to the wheel to cover the outboard surface side of the wheel center, said wheel cover having a circumferential portion extending from a disc shaped central portion, said circumferential portion in covering relation with the multi-flanged portion of the tire mounting rim of greater axial expanse, said disc shaped central portion having a concavely contoured surface extending from said circumferential portion and defining a plurality of apertures about a centrally located aperture which respectively are registered with said lug bolt apertures and hub opening of said wheel center, lip members about the edges of said apertures of the wheel cover extending within and gripping the edges of the hub opening and lug bolt apertures of the wheel center, a lip portion circumferentially disposed about the periphery of the circumferential portion of the wheel cover extending over and gripping the periphery of the tire mounting rim; and means binding the wheel cover permanently to the wheel to form an integral wheel structure.

4. The wheel structure according to claim 3 wherein the circumferential portion of the wheel cover is nested in contacting relation with the tire mounting rim of the wheel, the surface of the concavely contoured disc shaped central portion of the wheel cover facing the wheel center contacts a substantial area of the confronting surface of the wheel center, and the binding is adhesive sandwiched between the wheel cover and wheel to permanently bind them together at locations of their contacting confronting surfaces.

* * * * *